(12) United States Patent
Li et al.

(10) Patent No.: US 8,284,167 B2
(45) Date of Patent: Oct. 9, 2012

(54) ELECTRONIC DEVICE CAPABLE OF SHOWING PAGE FLIP EFFECT AND METHOD THEREOF

(75) Inventors: Xiao-Guang Li, Shenzhen (CN); Hsiao-Chung Chou, Taipei Hsien (TW); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 682 days.

(21) Appl. No.: 12/434,676

(22) Filed: May 3, 2009

(65) Prior Publication Data
US 2010/0045616 A1 Feb. 25, 2010

(30) Foreign Application Priority Data
Aug. 22, 2008 (CN) .......................... 2008 1 0304152

(51) Int. Cl.
*G06F 3/041* (2006.01)
(52) U.S. Cl. ........................................ 345/173; 715/702
(58) Field of Classification Search .................. 345/173; 715/700
See application file for complete search history.

(56) References Cited

U.S. PATENT DOCUMENTS

| 5,764,227 | A | * | 6/1998 | Ishimine | 715/807 |
| 5,900,876 | A | * | 5/1999 | Yagita et al. | 715/776 |
| 6,407,757 | B1 | * | 6/2002 | Ho | 715/776 |

* cited by examiner

*Primary Examiner* — Kevin M Nguyen
*Assistant Examiner* — Kenneth B Lee, Jr.
(74) *Attorney, Agent, or Firm* — Altis Law Group, Inc.

(57) ABSTRACT

A method for showing page flip effect when use electronic device enjoy electronic document, the method provides a flip-page operation table, the flip-page operation table defines relationships between flip effect parameters and lengths of a first touch path or a second touch path. The method comprising: receiving touch signals, determining the touch path and lengths of the touch path according the touch signals; determining which page will be brought into view (hereinafter target page) according to the touch path; obtaining a flip effect parameter when the touch path increase to lengths defined in flip effect table; combining a combined page according to the current page, the next page and the flip effect parameter. Present invention also providing an electronic device capable of executing said steps.

8 Claims, 18 Drawing Sheets

| Flip forward a page (of a first touch path) | | Flip back a page (of a second touch path) | |
| --- | --- | --- | --- |
| Lengths of the touch path "l" | Effect page | Lengths of the touch path "l" | Effect page |
| 0.5 centimeter | effect page 1 | 0.5 centimeter | an Nth flip-page figure |
| 1 centimeter | a second effect page 2 | 1 centimeter | a (N-1)th flip-page figure |
| …… | …… | …… | …… |
| 0.5N centimeters | an Nth flip-page figure | 0.5N centimeters | a first flip-page figure |

FIG. 3

| Parameter | A first group of coordinates | Image information | A second group of coordinates | A third group of coordinates |
|---|---|---|---|---|
| parameter 1 | { $(X_{11}, Y_{11})$, $(X_{12}, Y_{12})$, $(X_{13}, Y_{13})$, $(X_{14}, Y14)$ } | Text/image (e.g., watermark)/ blank | { $(X'_{11}, Y'_{11})$, $(X'_{12}, Y'_{12})$, $(X'_{13}, Y'_{13})$, $(X'_{14}, Y'_{14})$ } | { $(X''_{11}, Y''_{11})$, $(X''_{12}, Y''_{12})$, $(X''_{13}, Y''_{13})$, $(X''_{14}, Y''_{14})$, $(X''_{15}, Y''_{15})$ } |
| parameter 2 | { $(X_{21}, Y_{21})$, $(X_{22}, Y_{22})$, $(X_{23}, Y_{23})$, $(X_{24}, Y_{24})$ } | Text/image (e.g., watermark)/ blank | { $(X'_{21}, Y'_{21})$, $(X'_{22}, Y'_{22})$, $(X'_{23}, Y'_{23})$, $(X'_{24}, Y'_{24})$ } | { $(X''_{21}, Y''_{21})$, $(X''_{22}, Y''_{22})$, $(X''_{23}, Y''_{23})$, $(X''_{24}, Y''_{24})$, $(X''_{25}, Y''_{25})$ } |
| ⋮ | | | | |
| parameter n | { $(X_{N1}, Y_{N1})$, $(X_{N2}, Y_{N2})$, $(X_{N3}, Y_{N3})$, $(X_{N4}, Y_{N4})$ } | Text/image (e.g., watermark)/ blank | | { $(X''_{N1}, Y''_{N1})$, $(X''_{N2}, Y''_{N2})$, $(X''_{N3}, Y''_{N3})$, $(X''_{N4}, Y''_{N4})$, $(X''_{N5}, Y''_{N5})$ } |

FIG. 7

| Flip forward a page (of a first touch path) | | Flip back a page (of a second touch path) | |
|---|---|---|---|
| Lengths of the touch path "l" | parameter | Lengths of the touch path "l" | parameter |
| 0.5 centimeter | Parameter 1 | 0.5 centimeter | Parameter N |
| 1 centimeter | Parameter 2 | 1 centimeter | Parameter N-1 |
| …… | …… | …… | …… |
| 0.5N centimeters | Parameter N | 0.5N centimeters | Parameter 1 |

FIG. 9

ELECTRONIC DEVICE CAPABLE OF SHOWING PAGE FLIP EFFECT AND METHOD THEREOF

RELATED APPLICATIONS

This application is related to the following co-pending, commonly assigned patent applications, the disclosures of which are incorporated herein by reference in their entirety:
 1. "ELECTRONIC DEVICE CAPABLE OF SHOWING PAGE FLIP EFFECT AND METHOD THEREOF" by Li et al., whose application Ser. No. 12/350,231.
 2. "ELECTRONIC DEVICE CAPABLE OF SHOWING PAGE FLIP EFFECT AND METHOD THEREOF" by Li et al., whose application Ser. No. 12/351,859.

BACKGROUND

1. Technical Field

The disclosure relates to electronic devices and, particularly, to an electronic device capable of showing page flip effect and a method thereof.

2. Description of Related Art

Nowadays, many electronic devices, e.g., mobile phones, digital photo frames, electronic readers (e-reader), are capable of storing and displaying electronic documents (e.g., digital images, digital texts, etc). Usually, readability of these electronic devices deviates greatly from real paper print. For example, when people flip a page of an electronic document on these electronic devices, the page is directly changed without any visual effect simulating the turning of a page; as a result, it is difficult for people to get the feeling of reading real paper.

In order to resolve this problem, a software capable of generating a page flip effect when flipping through the pages of the digital document is introduced. However, a powerful processing unit is needed to run the software, which results in increase of the cost of these electronic devices.

Therefore, it is necessary to provide an electronic device and a method to overcome the above-identified deficiencies.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

FIG. 3 is a flip-page operation table in accordance with an exemplary embodiment.

FIGS. 5A-4E are a series of schematic diagrams illustrating a process of flipping a page backward in accordance with an exemplary embodiment.

FIG. 7 is a parameter table in accordance with another exemplary embodiment.

FIG. 9 is a flip-page operation table in accordance with another exemplary embodiment.

DETAILED DESCRIPTION

Figure 1:
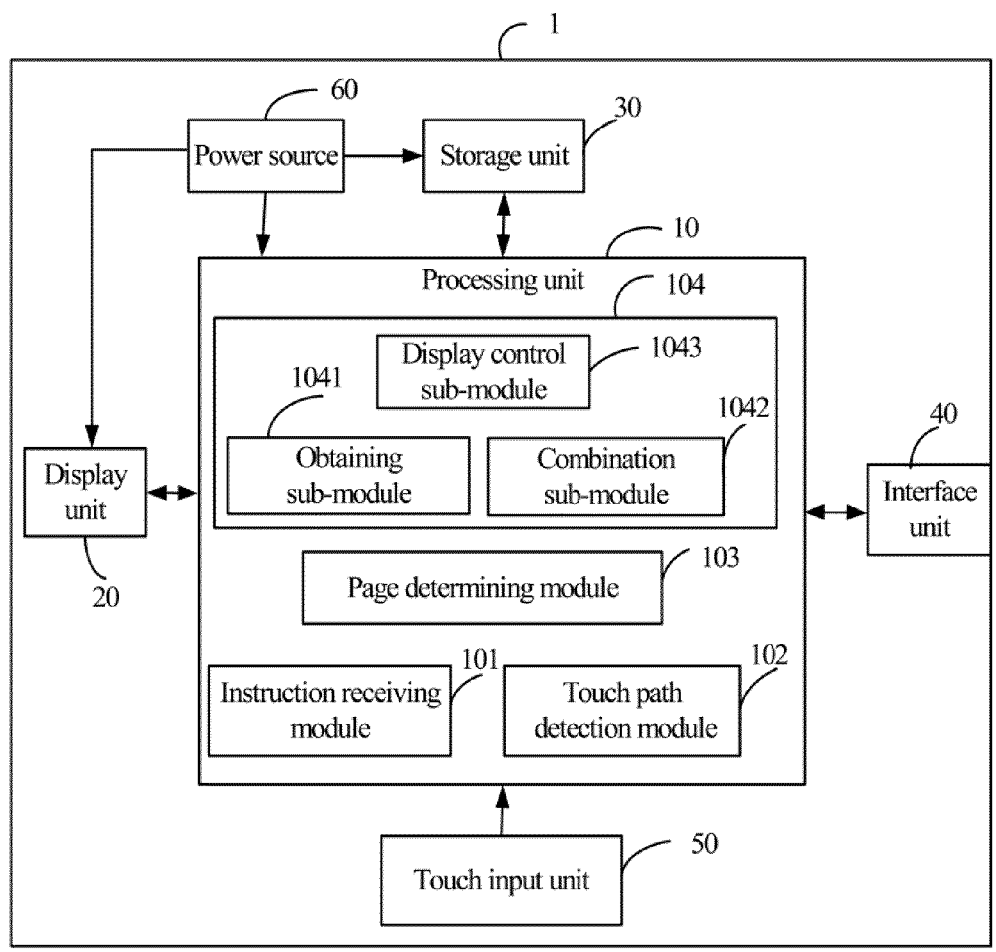
FIG. 1 is a block diagram of an electronic device capable of showing information with a page flip effect in accordance with an exemplary embodiment.

Referring to FIG. 1, an electronic device 1, capable of showing information with a page flip effect in accordance with an exemplary embodiment, includes a processing unit 10, a display unit 20, a storage unit 30, an interface unit 40, an touch input unit 50, and a power source 60. The electronic device 1 can be an e-reader, a mobile phone, or a digital photo frame, etc.

The interface unit 40 is configured to connect to an external electronic device (not shown). The external device can be a storage card (for example, a secure digital (SD) card, a compact flash (CF) card) or another electronic device (for example, a digital camera, a mobile phone, or a computer).

The touch input unit 50 is configured to generate touch signals in response to user operations. For example, the user can touch the touch input unit 50 with a finger or a stylus. The touch input unit 50 can be a touch panel. In the exemplary embodiment, the touch input unit 50 is an area extending horizontally. The electronic device 1 also includes other user input units (not shown) used for operating the electronic device 1, the other user input units can be an input key (button), a knob, a touch panel, and the like.

The storage unit 30 is configured to store electronic documents. The display unit 20 is configured to display the electronic documents. The electronic documents may include, but are not limited to, audio files, videos, digital images, texts, etc. In the exemplary embodiment, the storage unit 30 is a built-in storage unit, such as a flash memory, a micro drive, and so on. The storage unit 30 also stores a plurality of effect parameters and a flip-page operation table. The flip-page operation table defines relationships between flip effect parameters and lengths of touch paths.

The processing unit 10 includes an instruction receiving module 101, a touch path detection module 102, a page determining module 103, and a view control module 104. The instruction receiving module 101 is configured for receiving touch signals produced by the touch input unit 50. The touch path detection module 102 is configured for detecting direction of a path of a sliding touch on the touch input unit 50 (hereinafter, the touch path) and length of the touch path according to the touch signals received by the instruction receiving module 101. For example, when the sliding touch on the touch input unit 50 is from right to left, the touch path detection module 102 defines the touch path as a first touch path, whereas, the touch path detection module 102 defines the touch path as a second touch path when the sliding touch on the touch input unit 50 is from left to right and then determines the length of the touch path as the touch is executed as explained below. The page determining module 103 is configured for determining which page will be brought into view (hereinafter, the target page) according to the touch path. For example, if the touch path is the first touch path, the page determining module 103 determines the target page is a next page, namely the page determining module 103 determines to flip forward a page; if the touch path is the second touch path, the page determining module 103 determines the target page is a previous page, namely the page determining module 103 determines to flip back a page.

In the exemplary embodiment, the touch input unit 50 includes a series of touch sensors (not shown) arranged in a row, the touch path detection module 102 determines the touch path according to the sequence of the touch signals, and determines the length of the touch path according to the number of touch sensors between a current touch point and an initial touch point.

The view control module 104 is configured for producing a combined page according to current page, the target page, and the flip effect parameters. In the exemplary embodiment, the view control module 104 includes an obtaining sub-module 1041, a combination sub-module 1042, and a display control sub-module 1043. Functions of the above modules will be described below.

Figure 2:
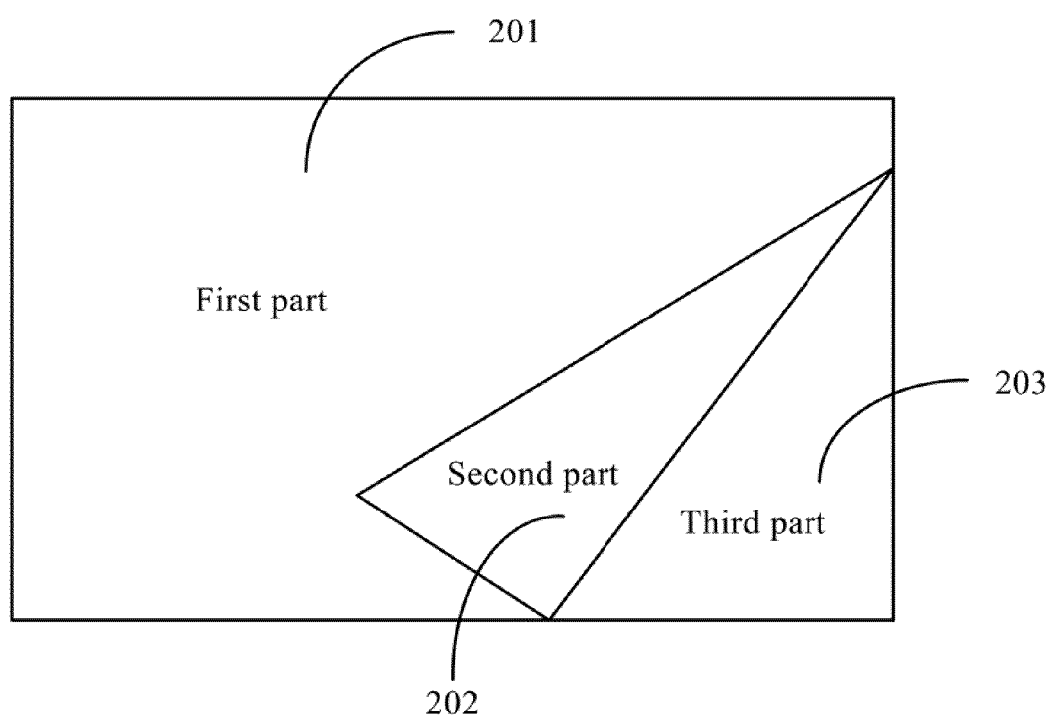
FIG. 2 is a schematic diagram illustrating an effect page in accordance with an exemplary embodiment.

Referring also to FIG. 2, in the exemplary embodiment, the flip effect parameters are a series of effect pages. Each of the effect pages includes a first part 201, a second part 202, and a third part 203. The first part 201 and the third part 203 are transparent. The second part 202 is a flip-page figure representing the flip effect, such as a dog-ear when flipping a page. The dog-ear can be a triangle, a quadrangle, a pentagon etc. The three parts of each of the effect pages are different in size and shape. The effect pages are ordered. The effect pages are presented in order in combination with the current page and the target page to form a series of combined pages in sequence as shown in FIGS. 4A-4E, and a series of effect pages in reverse order combines with the current page and the target page to form a series of combined pages in sequence as shown in FIGS. 5A-5E.

Referring also to FIG. 3, the flip-page operation table defines the relationships between effect pages and lengths of a touch input of the first touch path or the second touch path. The obtaining sub-module 1041 obtains an effect page according to the current length and the flip-page operation table. For example, if the touch path is the first touch path and the current length "1" is 0.5 centimeters, in other words since the beginning of a touch input, a user has traced a path 0.5 centimeters long, the obtaining sub-module 1041 obtains the first effect page, if the touch path is the second touch path and current length "1" is 0.5 centimeters, the obtaining sub-module 1041 obtains the Nth effect page.

Figure 4A:
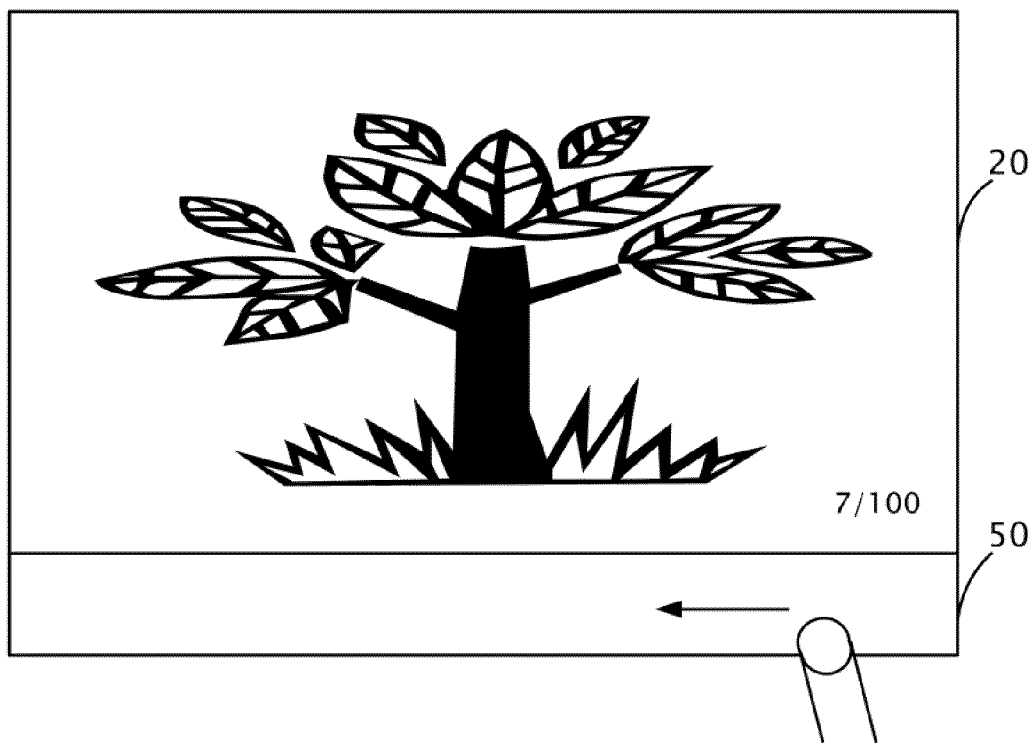
FIGS. 4A-4E are a series of schematic diagrams illustrating a process of flipping a page forward in accordance with an exemplary embodiment.
Figure 4B:
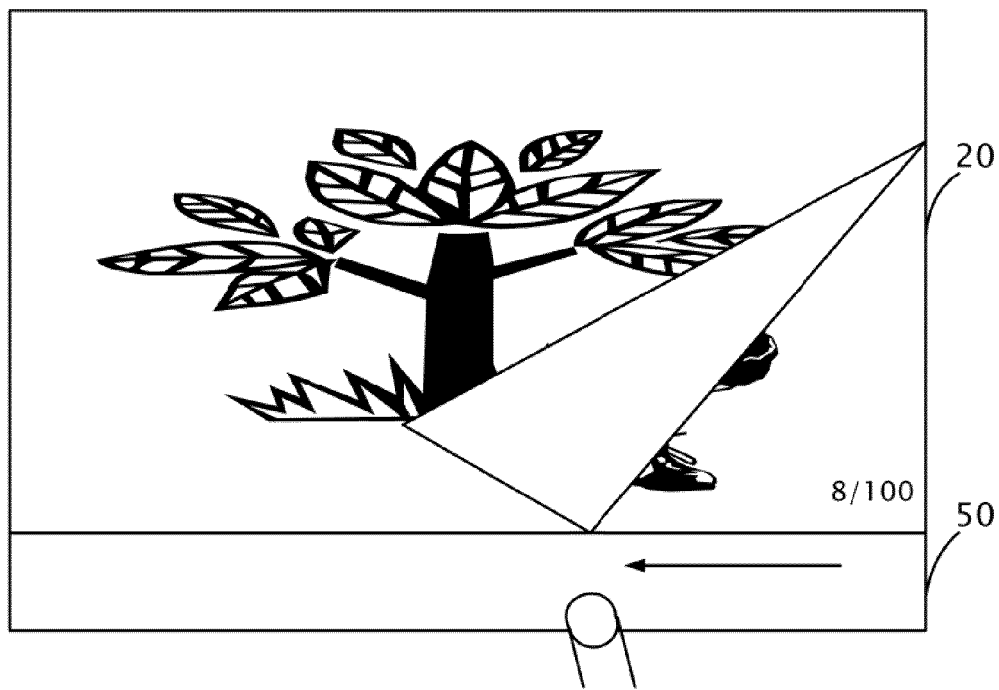

FIGS. 4A-4E showing the continuous process when flip a page forward. FIG. 4A shows a current image without page flipping effect, if the current page displayed on the display unit 20 is page 7/100 as shown in FIG. 4A, wherein 100 represents a total page number of a current text/album and 7 represents the current page. Therefore, if the touch path is the first touch path, the page determining module 103 determines the target page is page 8. When the touch path is the first touch path and the length of the touch path reaches to 0.5 centimeter, the obtaining sub-module 1041 obtains the first effect page from the storage unit 30 according to the flip-page operation table. The combination sub-module 1042 covers the current page (i.e., page 7) with the first effect page, obtains a part of the target page (i.e., page 8) whose size and location is the same as that of the third part of the first effect page, and covers the third part of the first effect page with the obtained part of page 8, and thus to obtain the first combined page as shown in FIG. 4B.

The display control sub-module 1043 controls the display unit 20 to display the first combined page after it has been combined by the combination sub-module 1042. Because a part of the first combined page corresponding to the first part of the first effect page is a part of the current page (i.e., page 7), a part of the first combined page corresponding to the second part of the first effect page is the dog-ear, and a part of the first combined page corresponding to the third part of the first effect page is a part of the next page (i.e., page 8), then, the first combined page shows the flipping effect that the page 7 is turned over a corner of page.

Figure 4C:
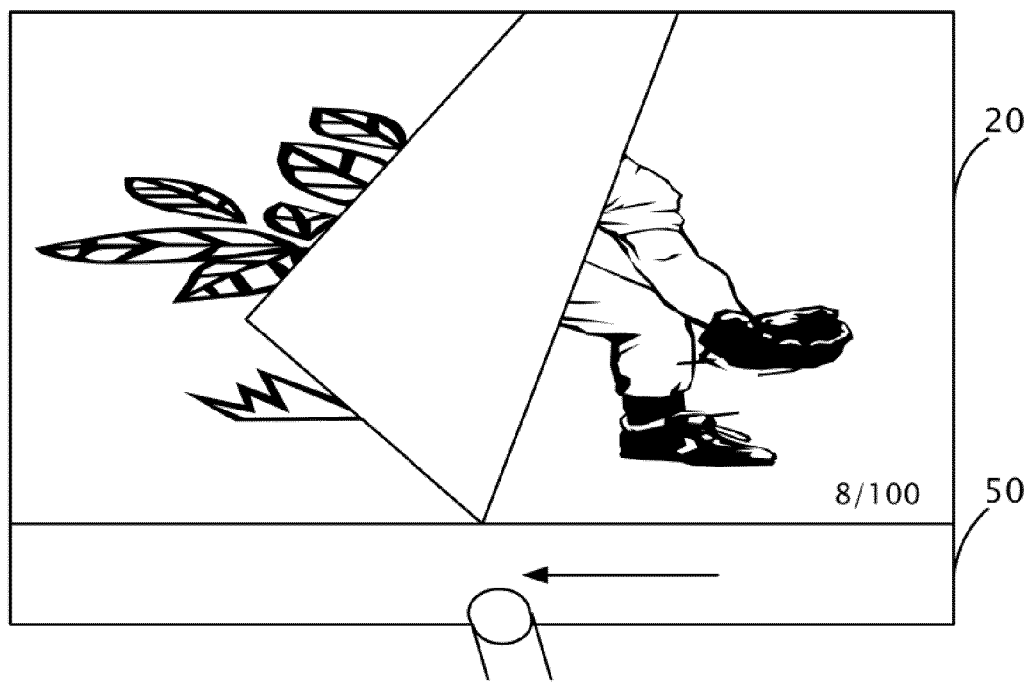
Figure 4D:
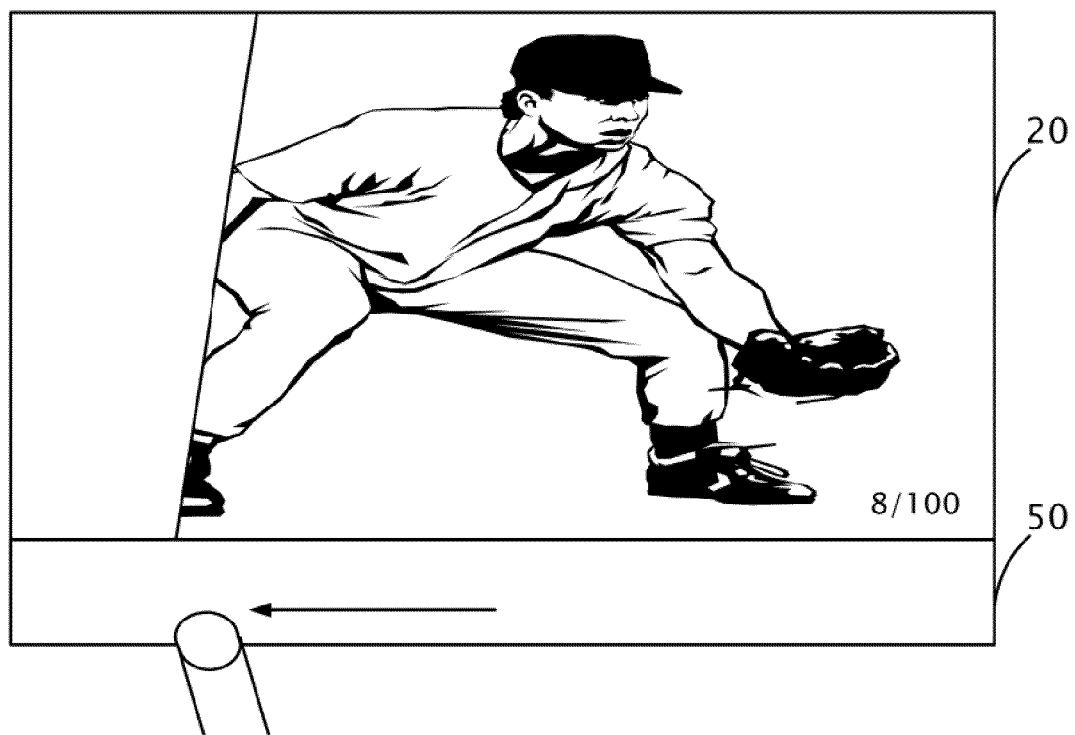
Figure 4E:
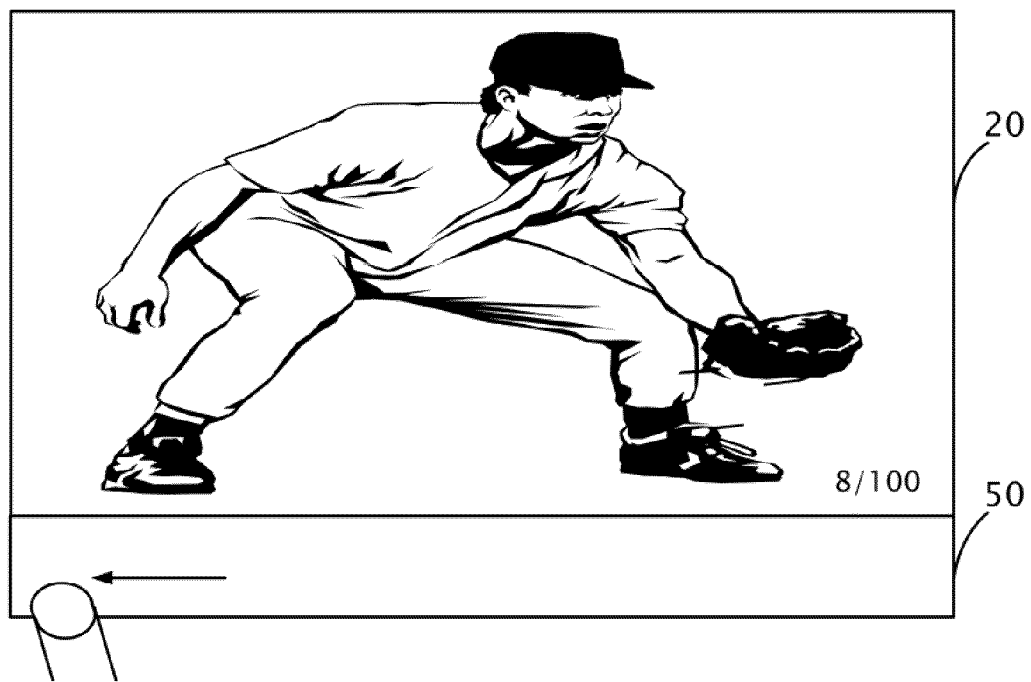

When the touch path is the first touch path and current length "1" reaches to 1 centimeter, the obtaining sub-module 102 obtains the second effect page correspond to the length "1 centimeter", the combination sub-module 1042 and the display control sub-module 1043 repeats covering and displaying processes described above to obtain the second combined page as shown in FIG. 4C. As the touch path increases to lengths defined in the flip-page operation table, the obtaining sub-module 1041, the combination sub-module 1042 and the display control sub-module 1043 repeats obtaining, covering and displaying processes described above, displaying the combined pages as shown in FIGS. 4B-4D, until the target page (i.e., page 8) is fully displayed on the display unit 20 as shown in FIG. 4E. By using the series of combined pages in sequence as shown in FIGS. 4A-4E, the page flip effect has the appearance of an actual physical page being turned to the next page.

FIGS. 5A-5E showing the process of flipping back a page when the second touch path is input. FIG. 5 shows a current image without page flipping effect. Supposing the current page is page 8, then when the user wants to flip back a page, the user inputs the left to right touch on the touch input unit 50, making the target page, page 7.

When the length of the touch path reaches to 0.5 centimeters, the obtain sub-module 1041 obtains the Nth effect page according to the flip-page operation table. The combination sub-module 1042 covers the current page (i.e., page 8) with the Nth effect page, obtains a part of the target page (i.e., page 7) whose size and location is the same as that of the first part of the Nth effect page, and covers the first part of the Nth effect page with the obtained part of page 7, and thus to obtain a combined page as shown in FIG. 5B.

Figure 5A:
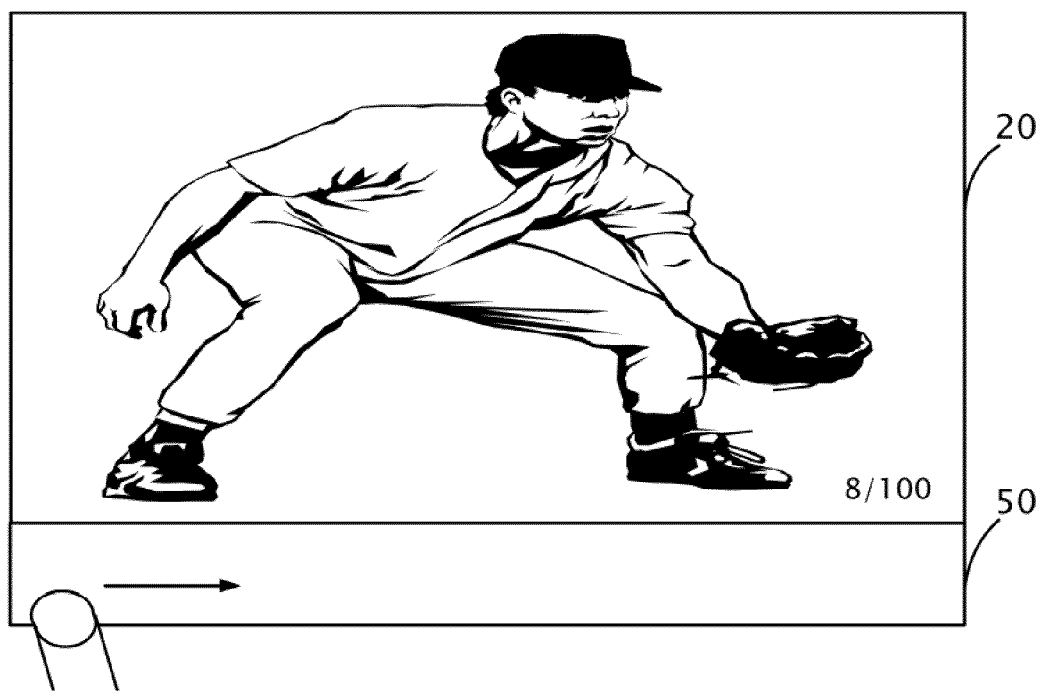
Figure 5B:
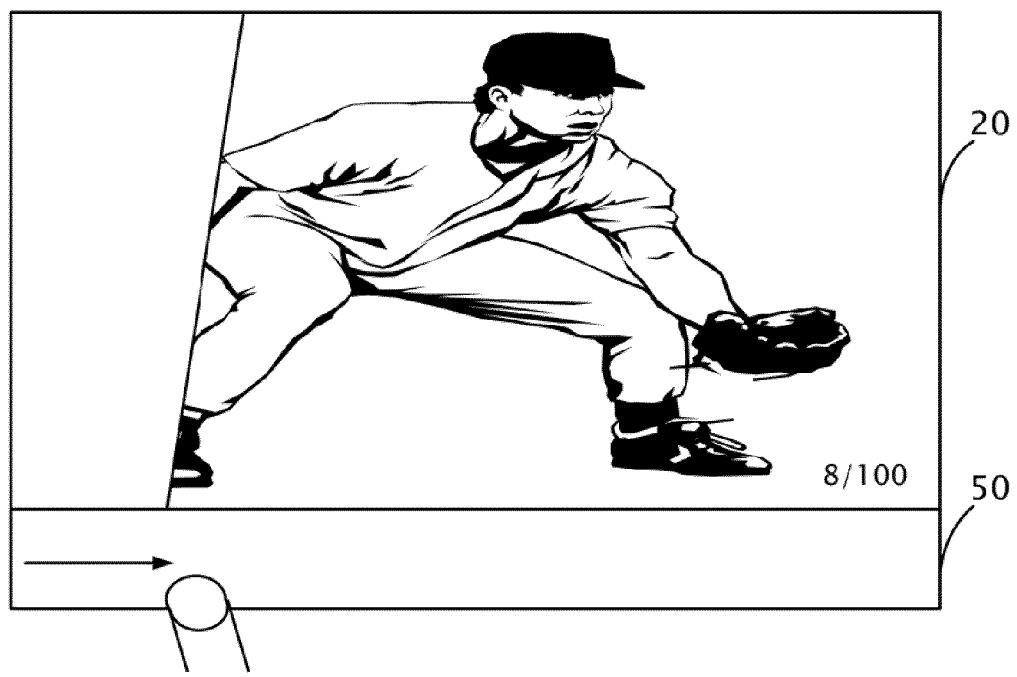

Because a part of the combined page as shown in FIG. 5B corresponding to the first part of the first effect page is a part of the target page (i.e., page 7), a part of the combined page corresponding to the second part of the first effect page is the dog-ear, and a part of the first combined page corresponding to the third part of the first effect page is a part of current page (i.e., page 8), then, the combined page as shown in FIG. 5B shows the flipping effect that the page 8 is cover a corner of page with the page 7.

Figure 5C:
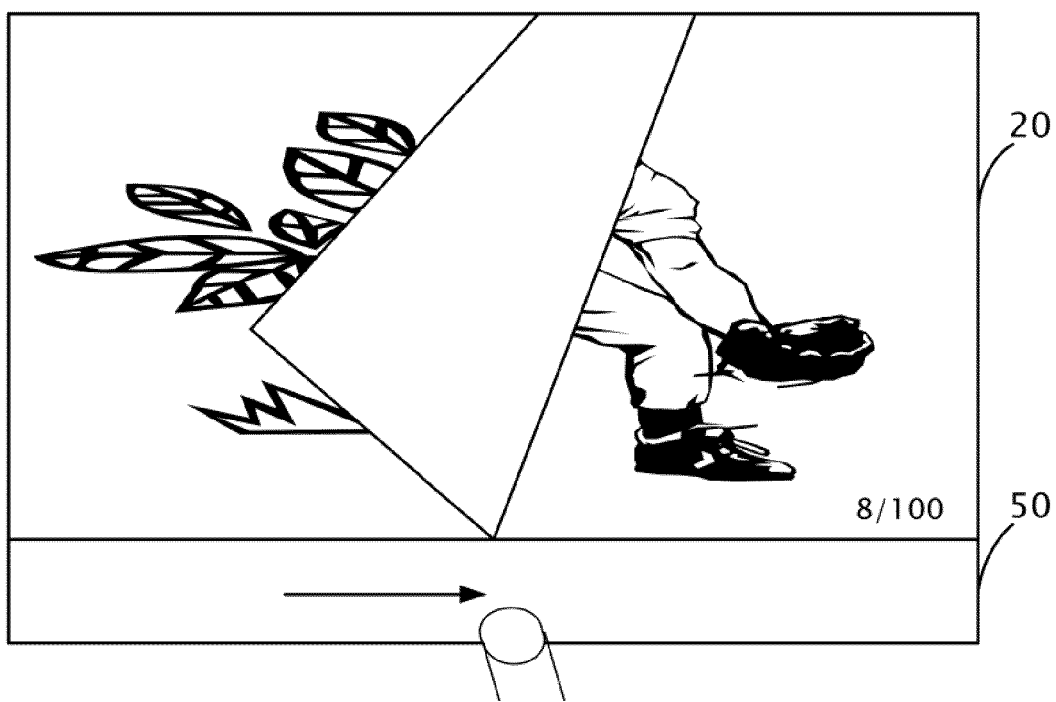
Figure 5D:
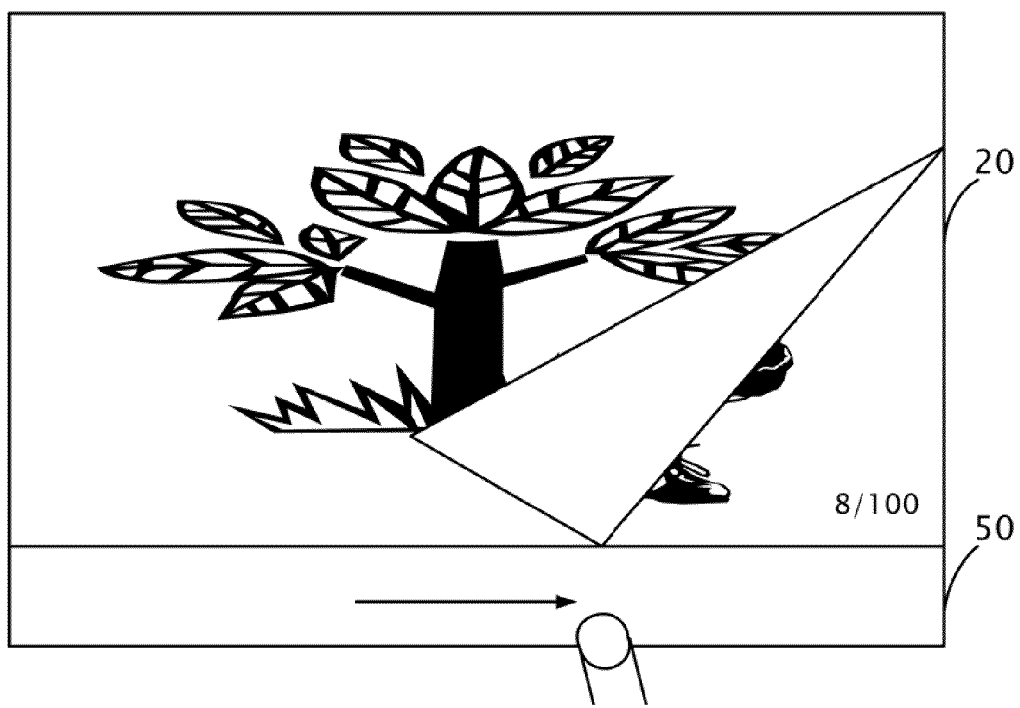
Figure 5E:
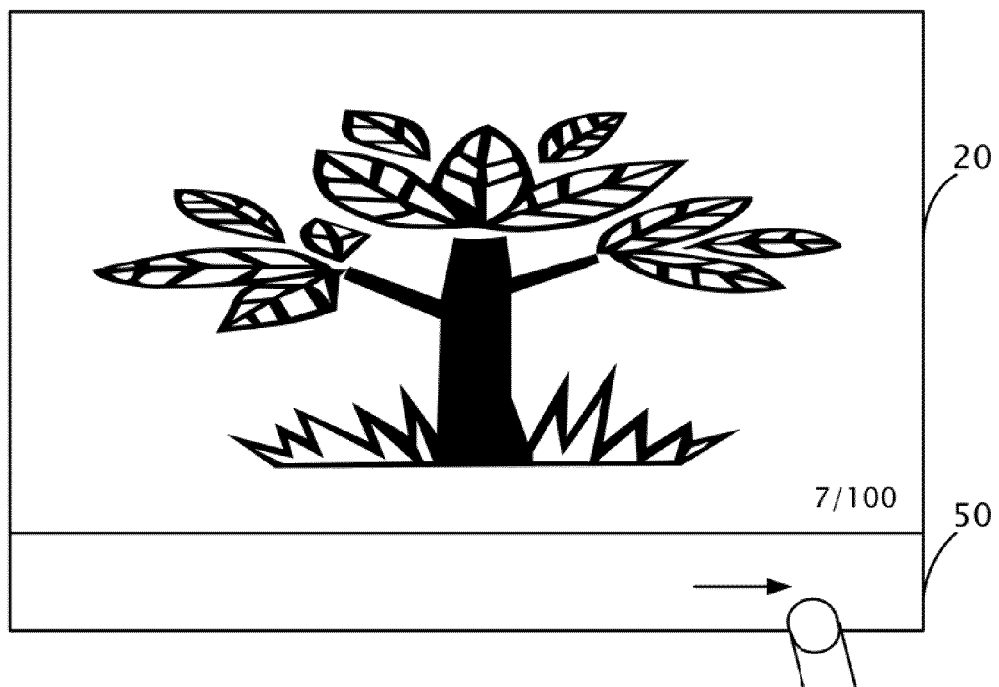

With the second touch path, when the touch path increases to lengths defined in the flip-page operation table, the obtaining sub-module 1041, the combination sub-module 1042 and the display control sub-module 1043 repeats obtaining, covering and displaying processes described above until the target page (i.e., page 7) is fully displayed on the display unit 20 as shown in FIG. 5E. During the repeating process, combined pages as shown in FIGS. 5B-5D are obtained. By using the series of pages in sequence as shown in FIGS. 5A-5E, the page flip effect has the appearance of an actual physical page being turned to the previous page.

Before the user operates the electronic device 1 to view electronic documents, the user can set flipping effect information. The flipping effect information may include, but is not limited to, content of the second part of the effect page, the number of the effect pages to be used in the process of completely flipping a page.

Figure 6:
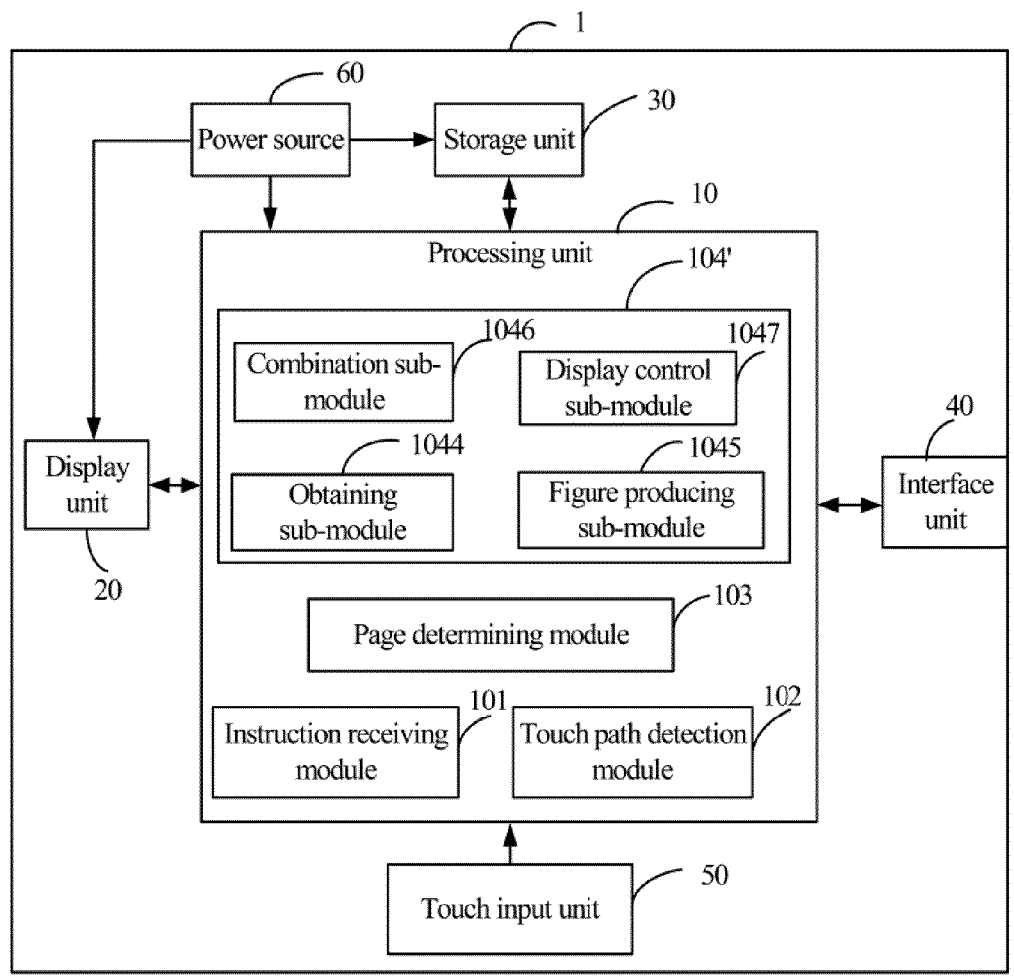
FIG. 6 is a block diagram of an electronic device capable of showing information with a page flip effect in accordance with another exemplary embodiment.

Referring to FIG. 6, in the second embodiment, a flip-control module 104' of the electronic device 1' includes an obtaining sub-module 1044, a figure producing sub-module 1045, a combination sub-module 1046, and a display control sub-module 1047. In the exemplary embodiment, the flip effect parameters are parameters of a parameter table.

Referring also to FIG. 7. The parameter table includes a plurality of parameters indicated as parameter 1 to parameter n, n being some whole number greater than zero. Each of the parameters includes a first group of coordinates, content of a flip-page figure, a second group of coordinates, and a third group of coordinates. The first group of coordinates is used to determine a first area of a page, the second group of coordinates is used to determine a second area of a page, the third group of coordinates is used to determine a third area of a page. In the exemplary embodiment, a first area of a combined page is an area displaying a flip-page figure which represents the page flip effects, such as a dog-ear representing a page turnover effect. A second area of a combined page is an area displaying a part of a target page when flipping a page forward, a third area of a combined page is an area displaying a part of a target page when flipping a page backward.

Figure 8:
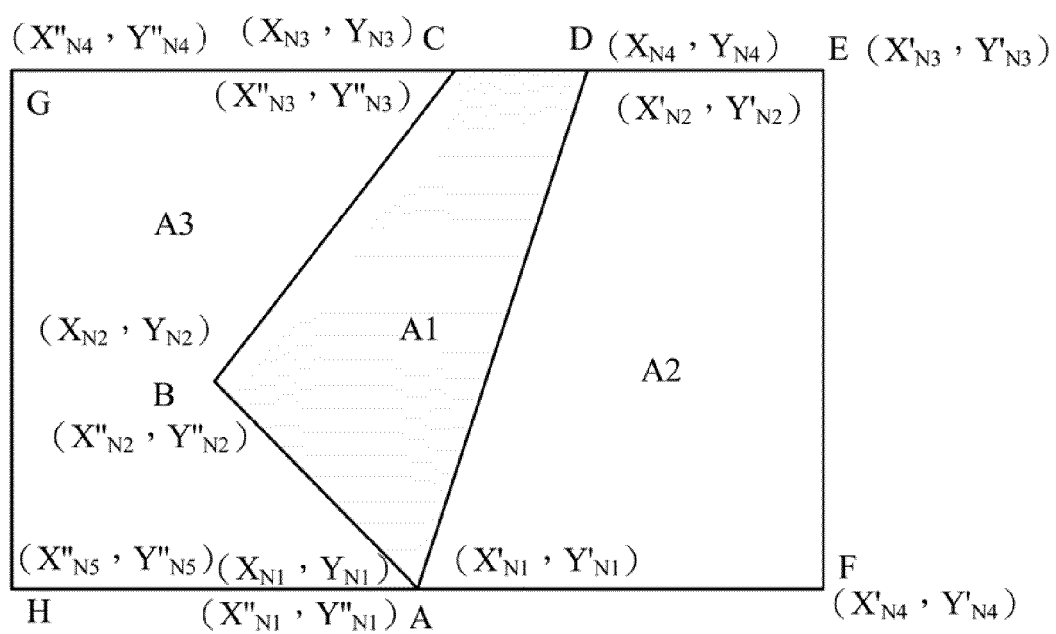
FIG. 8 is a schematic diagram illustrating areas determined by coordinates in accordance with another exemplary embodiment.

Referring to FIGS. 7 and 8, the first group of coordinates of parameter n, namely $(X_{N1}, Y_{N1})$, $(X_{N2}, Y_{N2})$, $(X_{N3}, Y_{N3})$, $(X_{N4}, Y_{N4})$ (N=1, 2 . . . ) respectively correspond to positioning points A, B, C, and D, and these four points determines four straight line to form a first area A1, namely the area of displaying the flip-page figure of the combined page. The second group of coordinates of parameter n, namely $(X'_{N1}, Y'_{N1})$, $(X'_{N2}, Y'_{N2})$, $(X'_{N3}, Y'_{N3})$, $(X'_{N4}, Y'_{N4})$ (N=1, 2 . . . ) respectively correspond to points A, D, E, and F, and these four points A, D, E, and F determine four straight lines to form a second area A2, namely the area of displaying a part of the target page of the combined page when flips a page forward. The third group of coordinates of parameter n, namely $(X''_{N1}, Y''_{N1})$, $(X''_{N2}, Y-_{N2})$, $(X''_{N3}, Y''_{N3})$, $(X''_{N4}, Y''_{N4})$, $(X''_{N5}, Y''_{N5})$ (N=1, 2 . . . ) respectively correspond to points A, B, C, G, and H, and these five points A, B, C, G, and H determine five straight lines to form a third area A3, namely the area of displaying a part of the target page of the combined page when flips a page backward. A number of the coordinates in the first group, the second group, and the third group can be changed according to user's preferences. Accordingly, shapes of the first area A1, the second area A2 and the third area A3 would be changed in response to the number of the coordinates, for example, the shapes can be in the form of triangle, quadrangle, or pentagon, etc.

Referring also to FIG. 9, in the second exemplary embodiment, the flip-page operation table defines relationships between parameters and lengths of the first touch path and the second touch path respectively. The obtaining sub-module 1044 obtains a parameter according to current path length and the flip-page operation table. For example, if the touch path is the first touch path and current length "1" reaches to 0.5 centimeter, the obtaining sub-module 1044 obtains a parameter 1, if the touch path is the second touch path and current length "1" reaches to 0.5 centimeter, the obtaining sub-module 1044 obtains a parameter n.

Referring again to FIGS. 4A-4E. Suppose current page is page 7 as shown in FIG. 4A, if the touch path is the first touch path (namely the touch path is from right to left), the page determining module 103 determines the target page is next page (i.e., page 8). when current length reaches to 0.5 centimeter, the obtaining sub-module obtains the parameter 1 from the parameter table. The figure producing sub-module 1045 produces the flip-page figure on the first area of the current page according to the first group of coordinates and the content of the flip-page figure. In detail, the figure producing sub-module 1045 determines the positioning points of the first area of the current page according to the first group of coordinates, and obtains the area of displaying the flip-page figure by connecting every two adjacent positioning points, and adds the content to the obtained area, thus forming the flip-page figure.

The combination sub-module 1046 determines a second area of the current page (i.e., page 7) and a second area of the next page (i.e., page 8) according to the second group of coordinates respectively. The combination sub-module 1046 covers the determined second area of the current page with the determined second area of the next page to obtain a combined page as shown in FIG. 4B, the display control sub-module 1047 displays the combined page accordingly.

Then, in the second embodiment, When the touch path is the first touch path, as the touch path increases to lengths defined in the flip-page operation table, the obtaining sub-module 1044, the figure producing sub-module 1045, combination sub-module 1046 and the display control sub-module 1047 repeat obtaining, producing, combining and displaying processes described above, combined pages as shown in FIGS. 4B-4D are displayed in sequence accordingly, until the target page (i.e., page 8) is fully displayed on the display unit 20 as shown in FIG. 4E.

Referring again to FIGS. 5A-5E. Suppose current page is page 8 as shown in FIG. 5A, if the touch path is the second touch path, the page determining module 103 determines the target page is the previous page (i.e., page 7). If the touch path is the second touch path and the length reaches to 0.5 centimeter, the obtaining sub-module obtains the parameter n from the parameter table. The figure producing sub-module 1045 produces the flip-page figure on the first area of the current page according to the first group of coordinates and the content of the flip-page figure of parameter n.

The combination sub-module 1046 determines a third area of the current page (e.g., 7) and a third area of the next page (e.g., 8) according to the third group of coordinates of the parameter n respectively. The combination sub-module 1046 covers the determined third area of the current page with the determined third area of the previous page to obtain a combined page as shown in FIG. 5B, the display control sub-module 1047 displays the combined page accordingly.

Then, in the second embodiment, if the touch path is the second touch path, as the touch path increases to lengths defined in the flip-page operation table, the obtaining sub-module, the figure producing sub-module 1045, combination sub-module 1046 and the display control sub-module 1047 repeat obtaining, covering and displaying processes described above, combined pages as shown in FIG. 5B-5D are displayed in sequence accordingly, until the target page (i.e., page 7) is fully displayed on the display unit 20 as shown in FIG. 5E.

Figure 10:
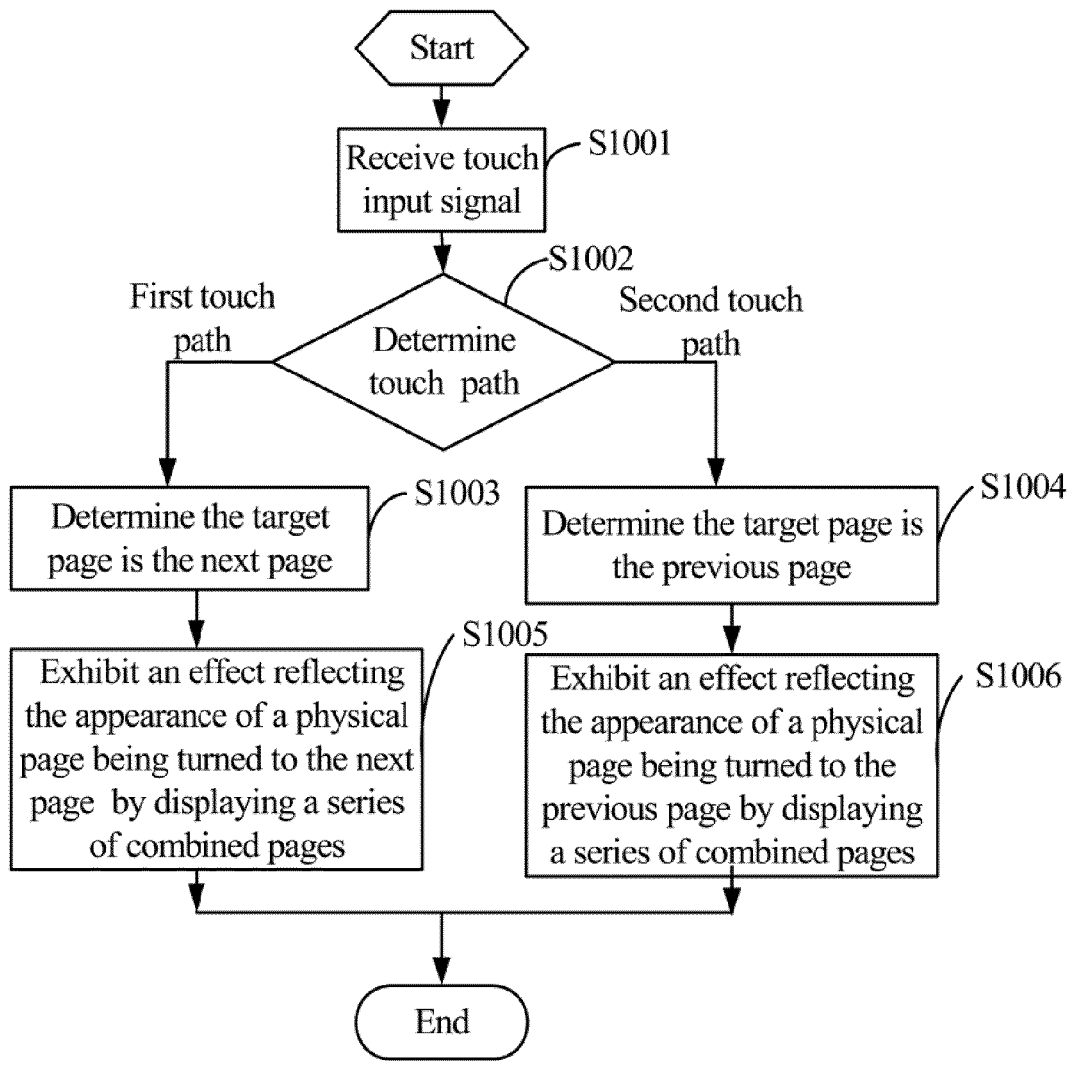
FIG. 10 is a flowchart illustrating a method for showing page flip effect applied in the electronic device of FIG. 1 or FIG. 6 in accordance with an embodiment.

FIG. 10 is a flowchart illustrating a method for showing page flip effect applied in the electronic device of FIG. 1 or FIG. 6 in accordance with an embodiment. In step S1001, the instruction receiving module 101 receives touch signals.

In step S1002, the touch path detection module 102 determines the touch path and lengths of the touch path according to the touch signals.

If the touch path detection module 102 determines the touch path is a first touch path, e.g., from right to left, in step S1003, the page determining module 103 determines the target page is a next page.

In step S1005, as the touch path detection module 102 determines the touch path increases to lengths defined in the flip-page operation table, the view control module 104/104' obtains a flip effect parameter according to the relationships between the flip effect parameters and the lengths of the first touch path defined in the flip-page operation table, produces a combined page according to the current page, the target page, and the flip effect parameter, and displays the combined page accordingly. Namely, when the touch path is the first touch path and the length of the touch path is gradually increased, a series of combined pages are produced and displayed, which exhibit the page flip effect reflecting the appearance of a physical page being turned to the next page.

If the touch path detection module 102 determines the touch path is a second touch path, e.g., from left to right, in step S1004, the page determining module 103 determines the target page is the previous page.

In step S1006, as the touch path detection module 102 determines the touch path increases to lengths defined in the flip-page operation table, the view control module 104/104' obtains a flip effect parameter according to the relationships between the flip effect parameters and lengths of the second touch path defined in the flip-page operation table, produces a combined page according to the current page, the target page, and the flip effect parameter, and displays the combined page accordingly. Namely, when the touch path is the second touch path and the length of the touch path is gradually increased, a series of combined pages are produced and displayed, which exhibit the page flip effect reflecting the appearance of a physical page being turned to the previous page.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An electronic device capable of showing page flip effect, the electronic device comprising:
   a touch input unit configured to generate touch signals in response to user operations;
   a storage unit configured to store electronic documents, a plurality of flip effect parameters, and a flip-page operation table, wherein the flip effect parameters comprises a plurality of effect pages, the flip-page operation table defines relationships between the effect pages and lengths of a first touch path or a second touch path produced by touching the touching input unit with finger or stylus, wherein, each of the effect pages comprises a first part, a second part, and a third part, the first part and the third part are both transparent figure, the second part is a flip-page figure representing the page flip effect;
   a display unit configured to display the electronic documents;
   a processing unit comprising:
   an instruction receiving module configured to receive the touch signals produced by the touch input unit;
   a touch path detection module configured to determine a touch path and a length of the touch path according to the touch signals;
   a page determining module configured to determine a target page according to the touch path; and
   a view control module comprising:
      an obtaining sub-module configured to obtain an effect page when the touch path increases to lengths defined in the flip-page operation table;
      a combination sub-module configured to cover the current page with the obtained effect page, and cover the third part of the obtained effect page with a part of the target page whose size and location is the same as that of the third part of the obtained effect page, and produce a combined page if the touch path is the first touch path, and configured to cover the current page with the obtained effect page, and cover the first part of the obtained effect page with a part of the target page whose size and location is the same as that of the first part of the obtained effect page, and produce a combined page if the touch path is the second touch path; and
      a display control sub-module configured to display the combined page on the display unit.

2. The electronic device of claim 1, wherein the touch input unit comprises a plurality of touch sensors, the touch path detection module determines the touch path according to the sequence of the touch signals received by the instruction receiving module and determines the length of the touch path according to the number of the touch sensors between an initial touch point and current touch point.

3. The electronic device of claim 1, wherein the page determining module determines the target page is a next page if the touch path detection module determines the touch path is a first touch path, and determines the target page is a previous page if the touch path detection module determines the touch path is a second touch path.

4. The electronic device of claim 1, wherein the first touch path is from right to left, and the second touch path is from left to right.

5. The electronic device of claim 1, wherein the electronic device is selected from the group consisting of an e-reader, a mobile phone, and a digital photo frame.

6. A method of an electronic device for showing page flip effect when flipping a page, the electronic device comprising a storage unit which stores a flip-page operation table and flip effect parameters, wherein, the flip page parameters are a plurality of effect pages, each of the effect pages comprises a first part, a second part, and a third part, the flip-page operation table defines relationships between the effect pages and lengths of a first touch path or a second touch path, wherein, the method comprising:
   receiving touch signals produced by a touch input unit;
   determining whether a touch input is a first touch path or a second touch path and lengths of the touch input according to the touch signals;
   determining a target page according to the touch input being a first touch path or a second touch path; and
   rendering a series of combined pages by:
      obtaining an effect page when the touch path increase to lengths defined in the flip-page operation table;
      covering the current page with the obtained effect page, and covering the third part of the obtained effect page with a part of the target page whose size and location is the same as that of the third part of the obtained effect page, and produce a combined page if the touch path is the first touch path;
      covering the current page with the obtained effect page, and covering the first part of the obtained effect page with a part of the target page whose size and location is the same as that of the first part of the obtained effect page, and produce a combined page if the touch path is the second touch path; and
      displaying the combined page on the display unit.

7. The method of claim 6, wherein the step of determining a target page according to the touch input being a first touch path or a second touch path comprises:
   determining the target page is a next page if the touch path is the first touch path; and
   determining the target page is a previous page if the touch path is the second touch path.

8. The method of claim 7, wherein the first touch path is from right to left, and the second touch path is from left to right.

* * * * *